US007539488B2

(12) United States Patent
Friedman

(10) Patent No.: US 7,539,488 B2
(45) Date of Patent: May 26, 2009

(54) OVER-THE-AIR DOWNLOAD (OAD) METHODS AND APPARATUS FOR USE IN FACILITATING APPLICATION PROGRAMMING IN WIRELESS NETWORK DEVICES OF AD HOC WIRELESS COMMUNICATION NETWORKS

(75) Inventor: Larry Alan Friedman, San Diego, CA (US)

(73) Assignee: Texas Instruments Norway AS, Oslo (NO)

( * ) Notice: Subject to any disclaimer, the term of this patent is extended or adjusted under 35 U.S.C. 154(b) by 274 days.

(21) Appl. No.: 11/270,811

(22) Filed: Nov. 9, 2005

(65) Prior Publication Data

US 2007/0105542 A1 May 10, 2007

(51) Int. Cl.
*H04M 3/00* (2006.01)
(52) U.S. Cl. .................. 455/420; 455/418; 455/419; 455/403
(58) Field of Classification Search .................. 455/420, 455/419, 418, 13.1, 16, 7, 403
See application file for complete search history.

(56) References Cited

U.S. PATENT DOCUMENTS

| 7,110,752 | B2 * | 9/2006 | Okajima ............ 455/419 |
| 2003/0065738 | A1 | 4/2003 | Yang et al. |
| 2004/0054787 | A1 | 3/2004 | Kjellberg et al. |
| 2004/0098715 | A1 | 5/2004 | Aghera et al. |
| 2005/0003826 | A1 * | 1/2005 | Khitrik et al. ........... 455/452.2 |
| 2005/0003829 | A1 | 1/2005 | Lala et al. |
| 2006/0025123 | A1 * | 2/2006 | Majmundar et al. ........ 455/419 |
| 2007/0042766 | A1 * | 2/2007 | Herle .................... 455/419 |

FOREIGN PATENT DOCUMENTS

GB     2410150     *  1/2004

OTHER PUBLICATIONS

PCT Search Report for Application No. PCT/US05/40617, Jul. 6, 2006.

* cited by examiner

*Primary Examiner*—Vincent P Harper
*Assistant Examiner*—Khai M Nguyen
(74) *Attorney, Agent, or Firm*—John J. Oskorep, Esq.

(57) ABSTRACT

In one illustrative example, a wireless network device of a low data rate wireless personal area network (WPAN) or the like includes a controller, memory for storing one or more application programs, and a wireless transceiver coupled to the controller and operative for communications in the wireless network. The controller is adapted to receive, through the wireless transceiver, an instruction which causes the wireless device to operate as a client in performing an OAD procedure for receiving the program from another wireless device which is operated as a server in the wireless network, and to operate the wireless device as the client in performing the OAD procedure in response to such instruction. The controller is further adapted to receive, through the wireless transceiver, one or more instructions for the wireless device to operate as a server in performing the OAD procedure for sending the program to one or more other wireless devices which are operated as clients in the wireless network, and to operate the wireless device as the server in performing the OAD procedure in response to such instructions. A, commissioner device of the wireless network may coordinate the assignment of client and server roles of the wireless devices for OAD procedures based on a variety of different heuristic or algorithmic techniques for optimal results.

20 Claims, 8 Drawing Sheets

US 7,539,488 B2

OVER-THE-AIR DOWNLOAD (OAD) METHODS AND APPARATUS FOR USE IN FACILITATING APPLICATION PROGRAMMING IN WIRELESS NETWORK DEVICES OF AD HOC WIRELESS COMMUNICATION NETWORKS

BACKGROUND

1. Field of the Technology

The present application relates generally to over-the-air download (OAD) procedures for wireless network devices in ad hoc wireless communication networks.

2. Description of the Related Art

Recently, suitable wireless networking solutions have been developed for applications in home and building automation, industrial control, lighting control, sensors, detectors, consumer electronics, PC peripherals, medical sensors, and a variety of other specific applications. In such networks, there may be tens or even hundreds of wireless network devices which control and/or communicate with various device components (e.g. sensors, lights, etc.) and form nodes of the wireless network. These wireless network devices may be situated in a variety of different locations and difficult to access once deployed. Such wireless network devices may be added in or taken away from the wireless network at any given time.

Each wireless network device has a small microcontroller which operates the wireless network device in accordance with an application program stored in memory. When one or more deployed wireless network devices need to have their application program "upgraded" or modified (e.g. to add a feature, or to fix a perceived problem), questions arise as to how to effectively orchestrate and manage over-the-air download (OAD) procedures in the wireless network. For example, concerns arise regarding unduly overloading any single wireless network device with the task of sending the upgraded application program to many other wireless network devices. Concerns also arise regarding network interference during concurrent file transfer transactions. Further, memory in each wireless network device is typically small and therefore problems regarding memory handling when updating the upgraded application program may arise. Several other concerns exist.

Accordingly, what are needed are procedures which overcome deficiencies of conventional approaches.

SUMMARY

Broadly, each wireless network device in an ad hoc wireless communication network is adapted to perform an over-the-air download (OAD) procedure as a client to wirelessly receive an updated application program from any other wireless network device operated as a server in the wireless network, and also adapted to perform the OAD procedure as a server to wirelessly send the updated application program to any other wireless network device operated as a client in the wireless network. A commissioner device of the wireless network may coordinate the assignment of client and server roles of the wireless network devices for OAD procedures based on a variety of different heuristic or algorithmic techniques for optimal results.

A wireless network device of the present application may include a controller, memory for storing one or more application programs, and a wireless transceiver coupled to the controller and operative for communications in an ad hoc wireless communication network. The controller is adapted to execute an application program for controlling operation of the wireless network device. The controller is further adapted to receive, through the wireless transceiver, an instruction which causes the wireless network device to operate as a client in performing an OAD procedure for receiving the application program from another wireless network device which is operated as a server in the wireless network, and to operate the wireless network device as the client in performing the OAD procedure in response to such instruction. The controller is further adapted to receive, through the wireless transceiver, one or more instructions which cause the wireless network device to operate as a server in performing the OAD procedure for sending the application program to another wireless network device which is operated as a client in the wireless network, and to operate the wireless network device as the server in performing the OAD procedure in response to such instructions.

An ad hoc wireless communication network of the present application may include at least a first wireless network device, a second wireless network device, and a third wireless network device. The first wireless network device has a first controller, a first wireless transceiver coupled to the first controller and operative for communications in the wireless network, and a first memory for storing one or more application programs. The first controller is adapted to execute the application program for controlling operation of the first wireless network device. The first controller is further adapted to receive, through the first wireless transceiver, an instruction which causes the first wireless network device to operate as a client in performing an OAD procedure for receiving the application program from the third wireless network device which is operated as a server in the wireless network, and to operate the first wireless network device as the client in performing the OAD procedure in response to such instruction. In addition, the first controller is further adapted to receive, through the first wireless transceiver, one or more instructions which cause the first wireless network device to operate as a server in performing the OAD procedure for sending the application program to the second wireless network device which is operated as a client in the wireless network, and to operate the first wireless network device as the server in performing the OAD procedure in response to such instructions.

Similar to the first wireless network device, the second wireless network device of the ad hoc wireless network has a second controller, a second wireless transceiver coupled to the second controller and operative for communications in the wireless network, and a second memory for storing one or more application programs. The second controller is adapted to execute the application program for controlling operation of the second wireless network device. The second controller is further adapted to receive, through the second wireless transceiver, an instruction which causes the second wireless network device to operate as a client in performing the OAD procedure to receive the application program from the first wireless network device which is operated as the server in the wireless network, and to operate the second wireless network device as the client in performing the OAD procedure in response to such instruction. The second controller is further adapted to receive, through the second wireless transceiver, one or more instructions which cause the second wireless network device to operate as a server in performing the OAD procedure for sending the application program to another wireless network device which is operated as a client in the wireless network, and to operate the second wireless network device as the server in performing the OAD procedure in response to such instructions.

An illustrative method for use in facilitating over-the-air download (OAD) procedures for a plurality of wireless network devices in an ad hoc wireless communication network may involve the acts of receiving, through a wireless transceiver of a wireless network device, an instruction to perform an OAD procedure with another wireless network device in the ad hoc wireless network; causing an instruction to initiate the OAD procedure to be sent to the other wireless network device through the wireless transceiver in response to receiving the instruction to perform the OAD procedure; receiving, through the wireless transceiver, an application program from the other wireless network device in the OAD procedure after causing the instruction to initiate the OAD procedure to be sent; and storing the application program in memory of the wireless network device. The act of receiving the instruction to perform the OAD procedure may comprise the further act of receiving an address which identifies the other wireless network device with which to perform the OAD procedure, and the act of causing the instruction to initiate the OAD procedure to be sent may comprise the further act of causing the instruction to be sent to the address which identifies the other wireless network device. Also, the act of receiving the instruction to perform the OAD procedure may comprise the further act of receiving a version number of the application program to be received in the OAD procedure, and the act of causing the instruction to initiate the OAD procedure to be sent to the other wireless network device may comprise the further act of causing the instruction to be sent along with the version number of the application program to be received in the OAD procedure.

A commissioner device of the present application may comprise a controller and a communication interface coupled to the controller. The controller may be operative to cause a status request to be sent to a wireless network device of a wireless communication network through the communication interface; receive a status reply from the wireless network device through the network interface which includes a version number of an application program of the wireless network device; and cause an instruction to be sent to the wireless network device through the communication interface which causes it to operate as a client in performing an OAD procedure with another wireless network device of the wireless network for receiving an upgraded application program. The controller may be further operative to cause a discovery request to be broadcasted in the wireless network and, in response to the discovery request, receive discovery responses from the wireless network devices through the communication interface which include addresses of the wireless network devices. The communication interface may be a wired communication interface for connecting with a wireless proxy device of the wireless network, such that the status request and the instruction comprise proxy messages sent by the commissioner device through the proxy device to the wireless network.

DETAILED DESCRIPTION OF THE PREFERRED EMBODIMENTS

According to the present application, each wireless network device of an ad hoc wireless communication network is adapted to perform an over-the-air download (OAD) procedure as a client to wirelessly receive an updated application program from any other wireless network device operated as a server in the wireless network, and also adapted to perform the OAD procedure as a server to wirelessly send the updated application program to any other wireless network device operated as a client in the wireless network. A commissioner device of the wireless network may coordinate the assignment of client and server roles of the wireless network devices for OAD procedures based on a variety of different heuristic or algorithmic techniques for optimal results.

Figure 1:
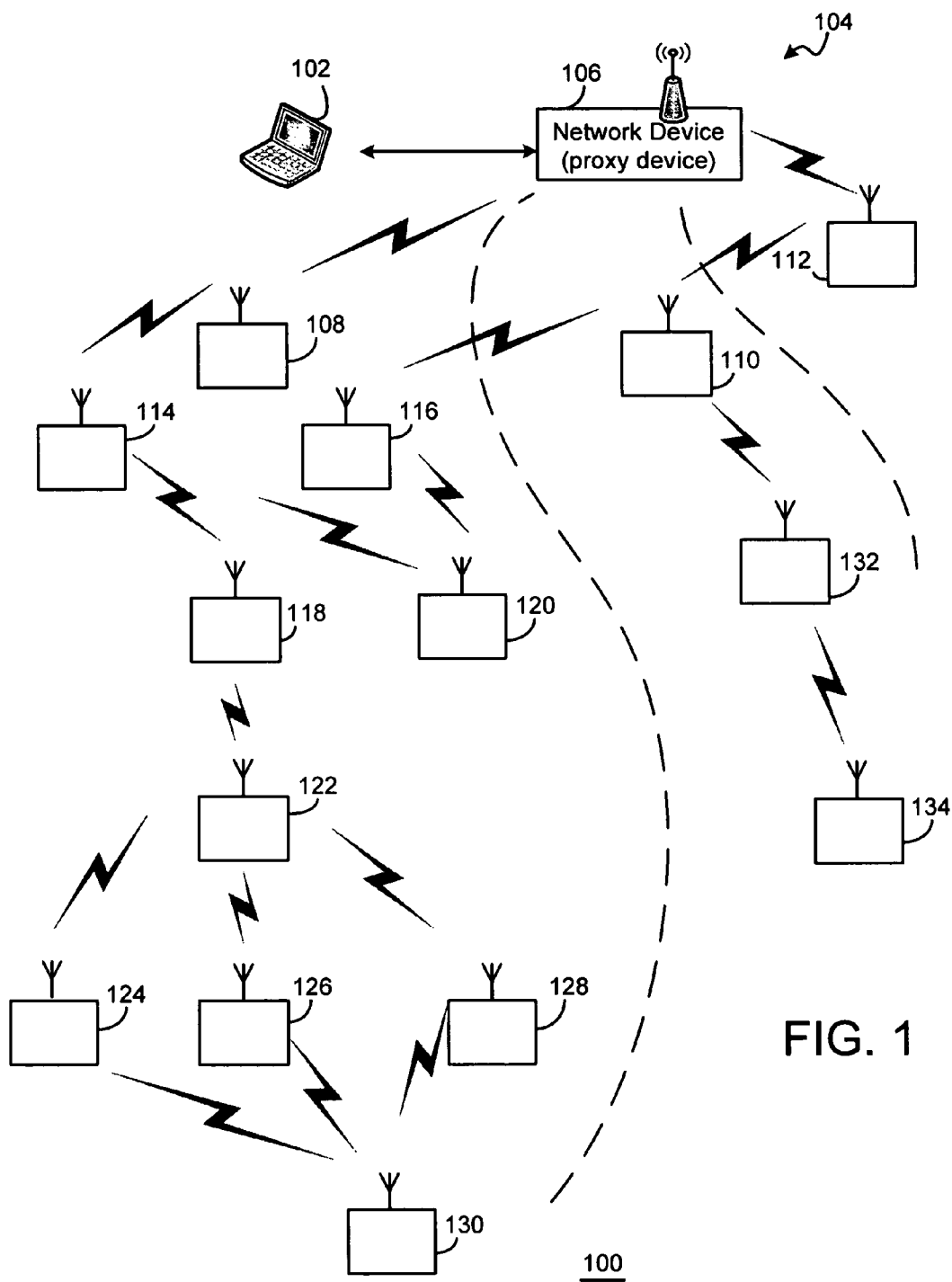
FIG. 1 is an illustration of an ad hoc wireless communication network having a plurality of wireless network devices, each device operating with use of an application program which is downloaded through use of over-the-air downloading (OAD) procedures of the present application.

To begin, FIG. 1 is an illustration of an ad hoc wireless communication network 100 having a plurality of wireless network devices 104. In addition to wireless network devices 104, wireless communication network 100 includes a commissioner device 102 and a wireless network device 106 which serves as a proxy for communications between commissioner device 102 and wireless network devices 104 (and thus may be referred to herein as a proxy device). Each wireless network device 104 of wireless communication network 100 operates with use of an application program which may be downloaded to it through use of an OAD procedure of the present application.

Wireless network 100 may be a low data rate wireless personal area network (WPAN) or similar type of network. Here, wireless network devices 104 are adapted to perform functions for a low data rate wireless networking application, such as a monitoring and/or control system application. These types of applications include building automation, industrial, medical and residential control, and monitoring applications. For these purposes, wireless network devices 104 may operate in accordance with the ZigBee™ standard specification. See e.g. the ZigBee™ specification, 053474r06, Version 1.0 (2005), made available from the ZigBee Alliance, Inc. Note that ZigBee™ is a trademark of the ZigBee Alliance, Inc. of San Ramon, Calif., U.S.A. Essentially, applications that require interoperability and/or RF performance characteristics of the IEEE 802.15.4 standard are well suited for ZigBee™ applications. Specific examples of such applications include lighting control; automatic meter reading; wireless smoke and carbon monoxide detectors; heating control; heating ventilation and air conditioning (HVAC) control; home security; environmental control; blind, drapery and shade control; medical sensing and monitoring; universal remote control to a set-top box which includes home control; and industrial and building automation.

Thus, wireless network devices 104 may operate as one or more types of small control devices such as sensor, detector, and lighting devices. In ZigBee™ and similar environments, wireless network devices 104 may be referred to as end devices. Some wireless network devices 104 may be communication routers or serve as communication routers in addition to their primary function. There may be tens (10s) or hundreds (100s) of such wireless network devices 104 in wireless network 100. In FIG. 1, there are a number of wireless networks devices shown which include wireless network devices 108, 110, 112, 114, 116, 118, 120, 122, 124, 126, 128, 130, 132, and 134. As suggested in the figure, wireless network devices 104 may be situated in various scattered (typically fixed) locations depending on the application and may communicate with and through each other. Some of wireless network devices 104 may be collocated, such as wireless network devices 108, 114, 116, 118, 120, 122, 124, 126, 128, and 130 which may be located within the same facility or room, and wireless network devices 110, 132, and 134 which may be located within the same facility or room different from the other facility or room, and wireless network device 112 which may be located within a facility or room different from the others. Wireless network devices 104 may be added on or taken away from wireless network 100 "on the fly."

In this embodiment, commissioner device 102 is a computer such as a personal computer (PC). However, commissioner device 102 may be any other type of comparable device or terminal. In basic form, commissioner device 102 merely has a controller or processor and computer instructions which are executed on the controller or processor for performing functions as described herein. In the present application, commissioner device 102 also has a communication interface and is physically connected to wireless network device 106 through a communication connection, such as a standard serial (e.g. RS-232), Universal Serial Bus (USB), or Ethernet connection. Commissioner device 102 may be the originating point of the updated application program to be downloaded within wireless network 100 using the OAD procedures. In this case, commissioner device 102 communicates with any of wireless network devices 104 through wireless network device 106 with use of proxy commands which wireless network device 106 is equipped to process (e.g. like a gateway).

Other than perhaps making the upgraded image (i.e. the upgraded application program) initially available on a wireless network device, commissioner device 102 does not participate in actual file transfer sessions. Based on its knowledge of the network topology, location of target platforms, and location of platforms that currently hold the upgrade image, commissioner device 102 assigns various wireless network devices as client-server pairs. Commissioner device 102 may coordinate the assignment of client and server roles of wireless network devices 104 for OAD procedures based on a variety of different heuristic or algorithmic techniques for optimal results. Additional details regarding commissioner device 102 and wireless network device 106 (the proxy) are described later below.

Note that one of the devices in wireless network 100 may serve as a coordinator device. A coordinator device is typically configured to perform functions such as maintaining global data for devices in wireless network 100, maintaining binding tables for devices in wireless network 100, assigning network identification to devices in wireless network 100, etc. The coordinator device in wireless network 100 may be, for example, wireless network device 110.

Figure 2:
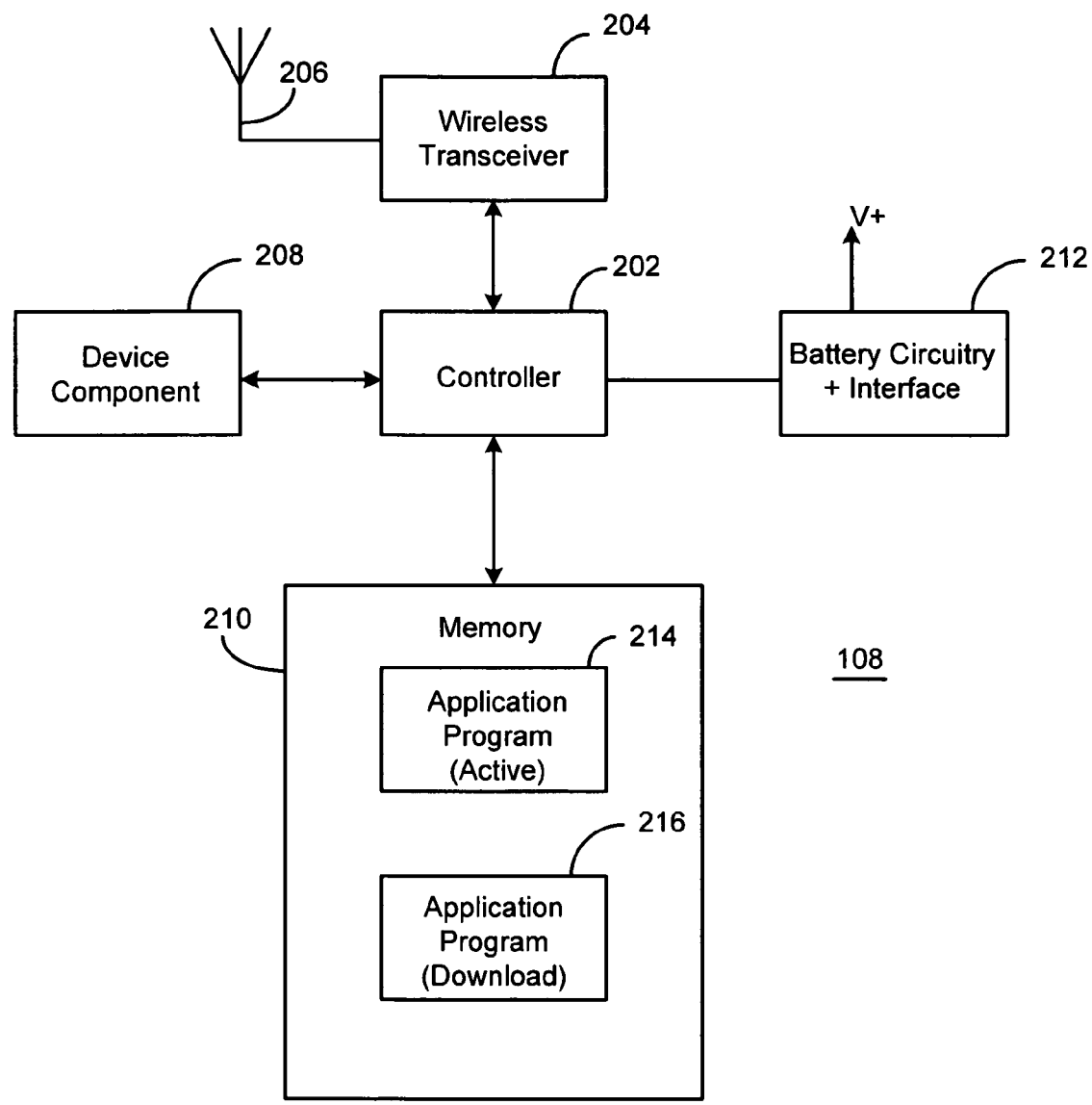
FIG. 2 is a schematic block diagram of a wireless network device of the wireless communication network.

FIG. 2 is a schematic block diagram of wireless network device 108 of the wireless network of FIG. 1. The schematic block diagram of wireless network device 108 of FIG. 2 may be representative of all other wireless network devices of the wireless network of FIG. 1. Wireless network device 108 includes a controller 202, memory 210, a wireless transceiver 204, an antenna means 206, a device component 208, and battery circuitry and interface 212. Controller 202 is coupled to memory 210, wireless transceiver 204, device component 208, and battery circuitry and interface 212 as shown. Battery circuitry and interface 212 is adapted to receive one or more batteries or battery packs which provide electrical power to most if not all electrical components of wireless network device 108. Typically, wireless network device 108 does not include any wired communication interface for data network communications.

Controller 202 is a software-program-controlled device such as a microcontroller or microprocessor. In one specific implementation, controller 202 is an ATmega128 Atmel microcontroller where memory 210 is an on-chip memory of about 128 kilobytes, made available by the Atmel Corporation of San Jose, Calif., U.S.A. Memory 212 is adapted to maintain storage of computer application programs for use by controller 202. Preferably, memory 212 is a Flash memory. As shown, memory 212 may retain storage of an active application program 212 and a downloaded application program 216. Application program 212 is designated as "active" because it is the program that controller 202 currently executes for operation of wireless network device 108. Application program 216 is designated as merely "downloaded" because it is the program that wireless network device 108 has downloaded but not currently executing for operation. Application program 216 may be an updated version of application program 212, which will be subsequently updated and written over in memory 212. On the other hand, application program 216 may be held in memory 212 merely for subsequent wireless communication to other wireless network devices and never be utilized as an active application program in wireless network device 108.

Controller 202 is operative to send and receive data wirelessly through wireless transceiver 204. Controller 202 is also operative to perform over-the-air download (OAD) procedures with use of wireless transceiver 204 in accordance with an OAD control program stored in memory 210. Wireless transceiver 204, which is coupled to antenna means 206, is a low data rate transceiver which operates in accordance with ZigBee™ specifications. A ZigBee™ compliant transceiver operates in accordance with IEEE 802.15.4 physical radio standard. The radio frequency (RF) bands utilized for ZigBee™ include unlicensed bands worldwide at 2.4 GHz (global), 915 MHz (the Americas), and 868 MHz (Europe). Raw data throughput rates of 250 Kbs may be achieved at 2.4 GHz (16 channels), 40 Kbs at 915 MHz (10 channels), and 20 Kbs at 868 MHz (1 channel). Transmission distances range from 10 to 100 meters for each wireless network device, which depends on power output and environmental characteristics. Controller 202 is also operative to interact with and/or control a device component 208 in accordance with application program 214. Device component 208 may be one of a variety of different types of components which will depend on the application (e.g. building automation, industrial, medical control, residential control, monitoring, etc.). Thus, device component 208 may be a sensor, a detector, a light, etc. Note also that some wireless network devices may be communication routers or serve as communication routers in addition to their primary function.

Figure 3:
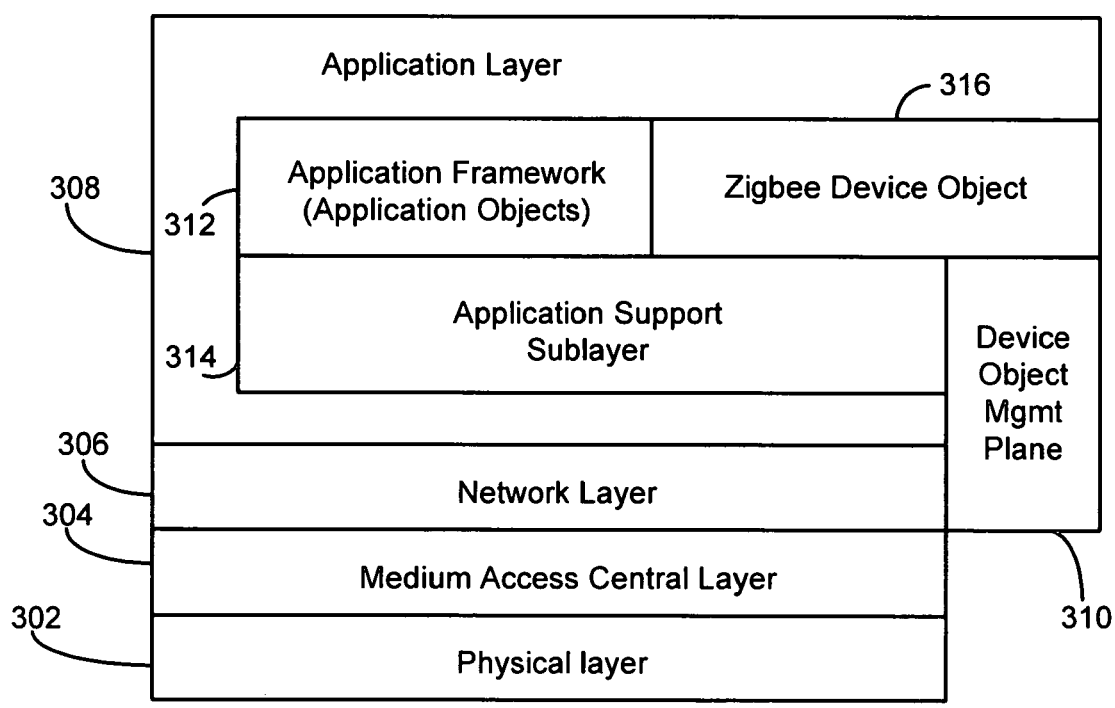
FIG. 3 is an illustration of a plurality of functional layers of a wireless network device of the wireless communication network.

FIG. 3 is an illustration of a plurality of functional layers 300 of a wireless network device of FIG. 2 in accordance with ZigBee™ technology. Functional layers 300 include a physical layer 302, a medium access control (MAC) layer 304, a network layer 306, and an application layer 308. Application layer 308 includes an application framework 308 for one or more application objects, a ZigBee™ device object 316, and an application support sublayer 314. Each layer performs a specific set of services for the layer above it, a data transmission service and a management entity provides all other services. Each service entity exposes an interface to the upper layer through a service access point (SAP), and each SAP supports a number of service primitives to achieve the required functionality.

The stack architecture of FIG. 3 is based on the standard Open Systems Interconnection (OSI) seven-layer model, but defines only those layers relevant to achieving the desired functionality for the particular application. The IEEE 802.15.4 (2003) standard defines two lower layers: physical layer 302 and MAC layer 304. ZigBee™ builds on this foundation by providing the network layer 306 and application framework 312 for the application layer, which includes the application support sub-layer (APS) 314, ZigBee™ device object (ZDO) 316, and manufacturer-defined application objects 312.

IEEE 802.15.4 defines two physical layers that operate in two separate frequency ranges, namely the 868/915 MHz band and the 2.4 GHz band. The lower frequency physical layer covers both the 868 MHz European band and the 915 MHz band that is used in countries such as the United States and Australia. The higher frequency physical layer is used virtually worldwide. The IEEE 802.15.4 MAC layer 304 controls access to the radio channel using a Carrier Sense Multiple Access with Collision Avoidance (CSMA-CA) mechanism. Its responsibilities may also include transmitting beacon frames, synchronization, and providing a reliable transmission mechanism.

The responsibilities of network layer 306 include mechanisms used to join and leave a network, to apply security to frames, and to route frames to their intended destinations. In addition, the discovery and maintenance of routes between devices devolve to network layer 306. Further, the discovery of one-hop neighbors and the storing of pertinent neighbor information are performed at network layer 306. The network layer 306 of a coordinator (e.g. coordinator device 110 of FIG. 1) is responsible for starting a new network, when appropriate, and assigning addresses to newly-associated devices.

The responsibilities of application support sublayer 314 include maintaining tables for binding, which is the ability to match two devices together based on their services and their needs, and forwarding messages between bound devices. The responsibilities of ZDO 316 include defining the role of the device within the network (e.g. coordinator or end device), initiating and/or responding to binding requests, and establishing a secure relationship between network devices. ZDO 316 is also responsible for discovering devices on the network and determining which application services they provide.

Network layer 306 supports star, tree, and mesh topologies. In a star topology, the network is controlled by one single device called the coordinator (e.g. coordinator device 110 of FIG. 1). The coordinator is responsible for initiating and maintaining the devices on the network, and all other devices (i.e. end devices) directly communicate with the coordinator. In mesh and tree topologies, the coordinator is responsible for starting the network and for choosing certain key network parameters; however the network may be extended through use of routers. In tree networks, routers move data and control message through the network using a hierarchical routing strategy. Tree networks may employ beacon-oriented communication as described in the IEEE 802.15.4 specification. Mesh networks allow full peer-to-peer communication. Routers in mesh networks do not emit regular IEEE 802.15.4 type beacons.

Figure 4:
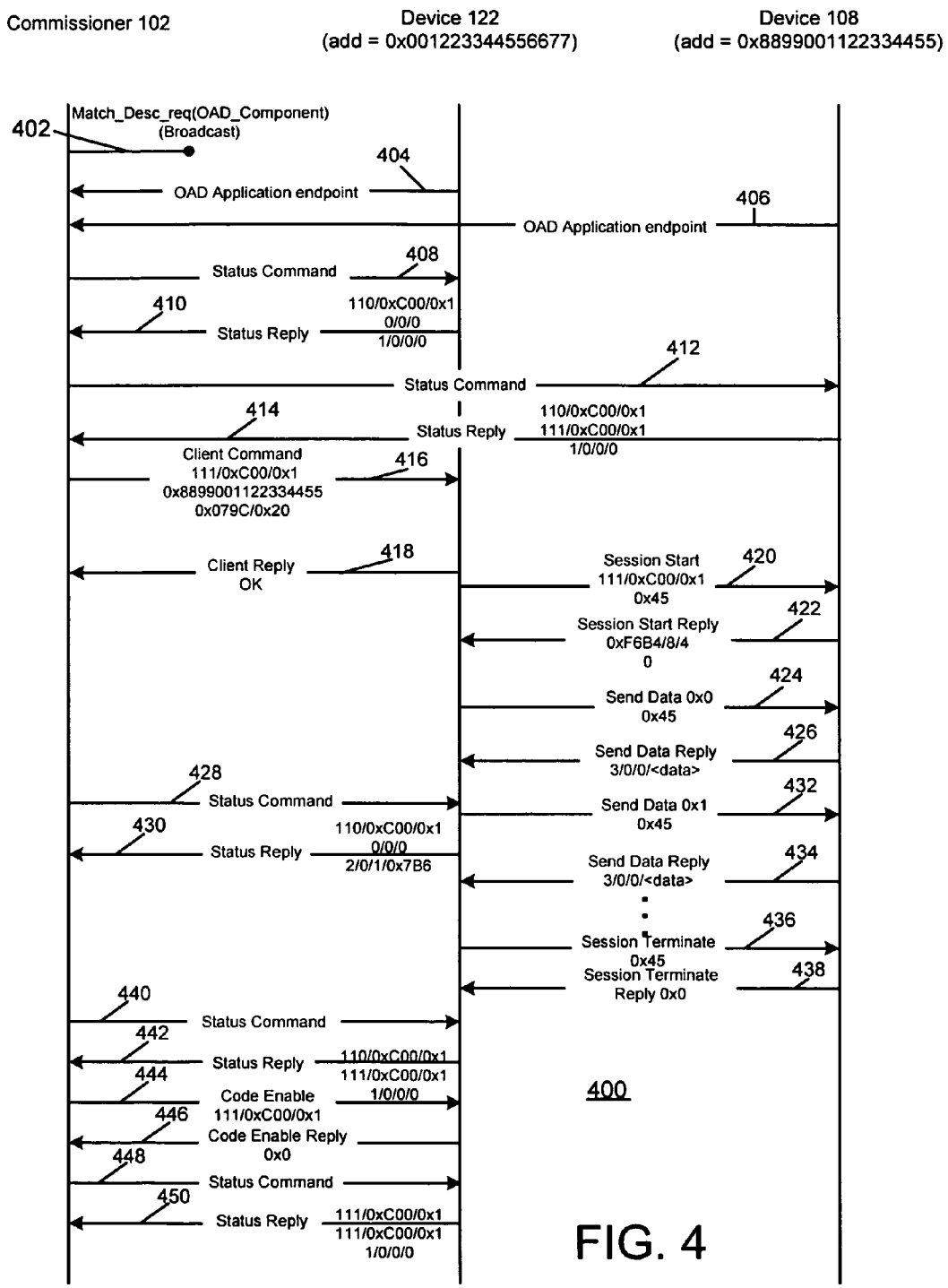
FIG. 4 is a first message flow diagram for an OAD procedure for wirelessly communicating an updated application program from a first wireless network device operating as a server to a second wireless network device operating as a client.

FIG. 4 is a message flow diagram of an over-the-air download (OAD) procedure for wirelessly communicating an updated application program to wireless network devices of an ad hoc wireless network (e.g. see FIGS. 1-3). Specifically in FIG. 4, an updated application program is wirelessly communicated from a wireless network device operating as a server (e.g. wireless network device 108) to a wireless network device operating as a client (e.g. wireless network device 122) in an OAD procedure. Such instructions are provided and roles are assigned by commissioner device 102 in an overall scheme to update various wireless network devices with the application program. Note that an "updated" or "upgraded" application program may include any suitable revision, version, or variation of the existing application program including any prior versions thereof.

The message flow of FIG. 4 is shown to be between commissioner device 102, wireless network device 122, and wireless network device 108. Although communications are shown as being made directly between devices 102, 108, and 122, communications may actually be routed through one or more intermediary wireless network devices which serve as routers (exclusively or additionally) in the wireless network. Further, a proxy device (e.g. wireless network device 106 of FIG. 1) which may be physically connected to commissioner device 102 may serve as an intermediary between commissioner device 102 and the wireless network devices of the wireless network. Note that a computer program product of the present application may include a computer readable medium and computer instructions stored in the computer readable medium which are executable by a processor of a wireless network device or other device for performing techniques described in relation to FIG. 4.

Initially, commissioner device 102 causes a device discovery request message 402 to be wirelessly broadcasted to devices in the ad hoc wireless network. In response, each wireless network device in the ad hoc wireless network responds with a discovery response message through its wireless transceiver. This discovery procedure allows commissioner device 102 to obtain identifications (addresses) of most all of the wireless network devices in the ad hoc wireless network. Specifically in FIG. 4, wireless network device 122 responds by transmitting a discovery response message 404 to commissioner device 102 through its wireless transceiver, and wireless network device 108 responds by transmitting a discovery response message 406 to commissioner through its wireless transceiver. As revealed in FIG. 4, wireless network device 108 is associated with an address of "0x8899001122334455" and wireless network device 122 is associated with an address of "0x0011223344556677".

Once commissioner device 102 receives the address of the wireless network devices, it obtains a status of the current version(s) of the application program(s) from each of any of the wireless network devices in the ad hoc wireless network. In FIG. 4, it is shown that commissioner device 102 causes a status command message 408 to be wirelessly transmitted to wireless network device 122 and, in response, receives a status reply message 408 transmitted from wireless network device 122. Commissioner 102 also causes a status command message 412 to be wireless transmitted to wireless network device 108 and, in response, receives a status reply message 414 transmitted from wireless network device 108. These status command messages 408 and 412 from commissioner device 102 are addressed directly to the desired wireless network devices, and status reply messages 410 and 414 are addressed directly back to commissioner device 102 (e.g. through the proxy).

In the present embodiment, each status reply message includes at least three items of information: (1) a version number of an "active" application program of the wireless network device; (2) a version number of a "downloaded" application program of the wireless network device; and (3) a state of the wireless network device. In FIG. 4, status reply message 410 indicates that wireless network device 122 has an active application program with a version number of "110/0xC00/0x1"; a downloaded application program with a version number of "0/0/0" (i.e. none exists); and a state of "1/0/0/0" which indicates that the device is in the OAD IDLE state (1), there is no error in response to this query (0), no packets have been sent or received (0) and no packets are expected to be transmitted or received (0). On the other hand, status reply message 414 indicates that wireless network device 108 has an active application program with a version number of "110/0xC00/0x1"; a downloaded application program with a version number of "111/0xC00/0x1"; and a state of "1/0/0/0" which indicates that the device is in the OAD IDLE state (1), there is no error in response to this query (0), no packets have been sent or received (0), and no packets are expected to be transmitted or received (0).

As apparent, wireless network device 108 has a downloaded application program (i.e. version 111/0xC00/0x1) that is an updated version of the active application program (i.e. version 110/0xC00/0x1) of wireless network device 122. Wireless network device 108 may have earlier obtained this updated application program through the same type of procedure being described now in relation to FIG. 4. Note that wireless network device 108 itself may or may not require use of the updated application program, and may merely retain such program for communication to one or more other wireless network devices.

After commissioner device 102 accesses the needs of the wireless network through the discovery procedures and status inquires, commissioner device 102 sends commands to at least some of the wireless network devices which instruct them to operate as clients in performing OAD procedures to receive the updated application program from another wireless network device. In FIG. 4, it is shown that commissioner 102 causes an OAD command 416 to be wirelessly transmitted to wireless network device 122 to instruct wireless network device 122 to obtain an updated application program from wireless network device 108. In the present embodiment, OAD command 416 specifies at least three items of information: (1) the version number of the application program to be downloaded ("111/0xC00/0x1"); (2) the IEEE address of wireless network device 108 with which to perform the OAD procedure ("0x8899001122334455"); and (3) the network address of wireless network device 108 with which to perform the OAD procedure ("0x079C/0x20"). In response to receipt of OAD command 416, wireless network device 122 sends an acknowledgement reply 418 to commissioner device 102.

In further response to receipt of OAD command 416, wireless network device 122 wirelessly transmits an OAD session start message 420 to wireless network device 108. This may be viewed as an OAD procedure request. Here, OAD session start message 420 is directed to the address of the wireless network device specified in the earlier received OAD command 416. In this embodiment, OAD session start message 420 provides the version number of the desired application program that it requests to receive ("111/0xC00/0x1") and a session number for the OAD procedure ("0x45"). In response, wireless network device 108 wirelessly transmits an OAD session start reply message 422 back to wireless network device 122. This reply message 422 acknowledges or confirms that wireless network device 108 indeed has the specified application program and is available to perform the OAD procedure with wireless network device 122. Note that the active image may be selected and requested as an alternative. Preferably, reply message 422 includes a size of the application program ("0xF6B4/8/4") as well as the block size (8 bytes) and the number of blocks (4) per data frame when sent. Through such instruction, wireless network device 108 is engaged to operate as a server in an OAD procedure with wireless network device 122.

In general a copy of the updated application program is wirelessly communicated from wireless network device 108 (i.e. server) to wireless network device 122 (i.e. client) in the OAD procedure. More specifically, wireless network device 122 operates as a client to wirelessly transmit a series of data request commands 424, 432, . . . , etc., to wireless network device 108, which are requests to receive particular data blocks of the application program in sequential order. The data blocks are wirelessly received through data reply messages 426, 434, . . . , etc., from wireless network device 108 which operates as a server. Each data request command from wireless network device 122 identifies the particular data block that it needs to receive. For example, "0x0" in data request command 424 is an offset to the first data block of the application program, and "0x1" in data request command 426 is the next offset to the second data block of the application program, etc. Each data reply message from wireless network device 108 identifies the particular data block (e.g. as an offset into the application program) that it is sending to wireless network device 122 (e.g. "0x0" in data reply message 426 and "0x1" in data reply message 434), as well as the current device state (3=Server), any error status in response to the command (0=none), and the data block itself. Once the entire application program has been downloaded, wireless network device 122 sends a 'session terminate command 436 to wireless network device 108. In response, wireless network device 108 sends a session terminate reply 438 to wireless network device 122. This ends the OAD communication session.

During or after communication of the updated application program, commissioner device 102 may send one or more status command messages to wireless network device 122 to identify the progress or current state of wireless network device 122. For example, commissioner device 102 may send a status command message 428 to wireless network device 122 during the communication of the application program, where wireless network device 108 responds by sending a status reply message 430 to commissioner device 102 indicating that the current transfer of the updated application program is incomplete ("110/0xC00/0x1" as the active application program; "0/0/0" as the downloaded application program which is not completely downloaded; and "2/0/1/0x7B6" as the state which indicates the device status (2=Client), the error response to this query (0=none), the number of the current packet in the session (1), and the total number of packets expected in session (0x7B6). As another example, commissioner device 102 may send a status command message 440 to wireless network device 122 after the download of the updated application program, where wireless network device 108 responds by sending a status reply message 442 to commissioner device 102 indicating that the current transfer of the application program is complete ("110/0xC00/0x1" as the active application program; "111/0xC00/0x1" as the downloaded application program; and "1/0/0/0" as the state which indicates that device is in the OAD IDLE state (1), the error status to this query (0=none), and, as there is no session in progress, the current packet number is 0 and 0 packets are expected).

When an application program has been downloaded to a wireless network device, it is not automatically enabled as the active application program of the wireless network device. Sometime after commissioner device 102 identifies that an application program has been completely downloaded, it may enable the downloaded application program as the active application program of a wireless network device. In FIG. 4, commissioner device 102 sends a program enable command 444 to wireless network device 122. Program enable command 444 specifies the version number of the application program which should be made active (e.g. "111/0xC00/0x1") in wireless network device 122. In response, wireless network device 122 causes the downloaded application program to serve as the active application program, writing over the current active application program with the downloaded application program. The overwriting procedure may be performed in accordance with the techniques described later in relation to FIGS. 7-11. Wireless network device 122 responds to commissioner device 102 with a program enable reply 446. Preferably, commissioner device 102 waits for all desired wireless network devices to have received the updated application program before instructing the devices to activate the program.

After activation of the updated application program, commissioner device 102 may send another status command message 428 to wireless network device 122. Here, wireless network device 108 responds by sending a status reply message 430 to commissioner device 102 which indicates that the current download and activation of the application program is complete ("111/0xC00/0x1" as the active application program; "111/0xC00/0x1" as the downloaded application program; and "1/0/0/0" as the state which indicates that device is in the OAD IDLE state (1), the error status to this query (0=none), and, as there is no session in progress, the current packet number is 0 and 0 packets are expected). The OAD procedure between wireless network devices 108 and 122 is complete.

Figure 5:
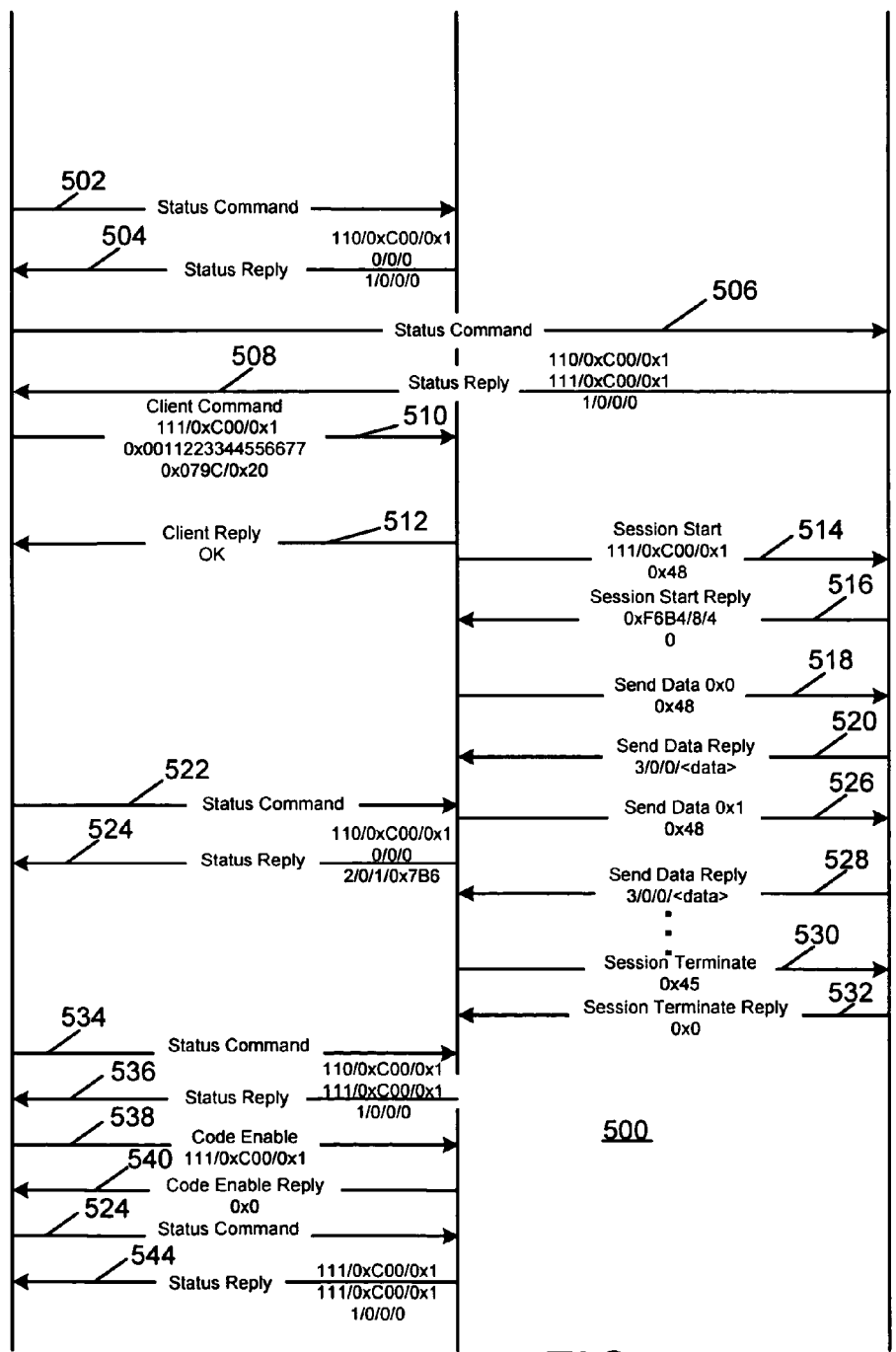
FIG. 5 is a second message flow diagram for an OAD procedure for wirelessly communicating the updated application program from the second wireless network device operating as a server to a third wireless network device operating as a client.

FIG. 5 is a second message flow diagram for an OAD procedure for wirelessly communicating the updated application program from a wireless network device operating as a server (e.g. wireless network device 122) to a wireless network device operating as a client (e.g. wireless network device 130). This message flow is substantially the same as that described above in relation to FIG. 5, except that wireless network device 122 operates as a server in an OAD procedure (in contrast to a client) and a new wireless network device 130 operates as a client to download the application program. Again, such instructions are provided and roles are assigned by commissioner device 102 in the overall scheme to update various wireless network devices with the application program. Note that an "updated" or "upgraded" application program may include any suitable revision, version, or variation of the existing application program including any prior versions thereof.

The message flow of FIG. 5 is shown to be between commissioner device 102, wireless network device 130, and wireless network device 122. Although communications are shown as being made directly between devices 102, 122, and 130, communications may actually be routed through one or more intermediary wireless network devices which serve as routers (exclusively or additionally) in the wireless network. Further, the proxy device (e.g. wireless network device 106 of FIG. 1) which may be physically connected to commissioner device 102 may serve as an intermediary between commissioner device 102 and the wireless network devices of the wireless network. Note that a computer program product of the present application may include a computer readable medium and computer instructions stored in the computer readable medium which are executable by a processor of a wireless network device or other device for performing techniques described in relation to FIG. 5.

After device discovery procedures, where commissioner device 102 receives the address of the wireless network devices (e.g. see messages such as messages 402, 404, and 406 of FIG. 4), commissioner device 102 may obtain a status of the current version(s) of the application program(s) from each of any of the wireless network devices in the ad hoc wireless network. In FIG. 5, it is shown that commissioner device 102 causes a status command message 502 to be wirelessly transmitted to wireless network device 130 and, in response, receives a status reply message 504 transmitted from wireless network device 130. Commissioner 102 also causes a status command message 506 to be wireless transmitted to wireless network device 122 and, in response, receives a status reply message 508 transmitted from wireless network device 122. These status command messages 502 and 506 from commissioner device 102 are addressed directly to the desired wireless network devices, and status reply messages 504 and 508 are addressed directly back to commissioner device 102 (e.g. through the proxy).

Each status reply message may include three items of information: (1) a version number of an "active" application program of the wireless network device; (2) a version number of a "downloaded" application program of the wireless network device; and (3) a state of the wireless network device. In FIG. 5, status reply message 504 indicates that wireless network device 130 has an active application program with a version number of "110/0xC00/0x1"; a downloaded application program with a version number of "0/0/0" (i.e. none exists); and a state of "1/0/0/0" which indicates that device is in the OAD IDLE state (1), the error status to this query (0=none), and, as there is no session in progress, the current packet number is 0 and 0 packets are expected). On the other hand, status reply message 508 indicates that wireless network device 122 has an active application program with a version number of "111/0xC00/0x1" (previously downloaded and activated); a downloaded application program with a version number of "111/0xC00/0x1" (previously downloaded); and a state of "1/0/0/0" which indicates that device is in the OAD IDLE state (1), the error status to this query (0=none), and, as there is no session in progress, current packet number is 0 and 0 packets are expected). As apparent, wireless network device 122 has a downloaded application program (i.e. version 111/0xC00/0x1) that is an updated version of the active application program (i.e. version 110/0xC00/0x1) of wireless network device 130. Wireless network device 122 has earlier obtained this updated application program through the same type of procedure (see previous description in relation to FIG. 4).

After commissioner device 102 accesses the needs of the wireless network through the discovery procedures and status inquires, commissioner device 102 sends commands to at least some of the wireless network devices which instruct them to operate as clients in performing OAD procedures to receive the updated application program from one or more other wireless network devices. In FIG. 5, it is shown that commissioner 102 causes an OAD command 510 to be wirelessly transmitted to wireless network device 130 to instruct wireless network device 130 to obtain an updated application program from wireless network device 122. In the present embodiment, OAD command 510 specifies at least three items of information: (1) the version number of the application program to be downloaded ("111/0xC00/0x1"); (2) the IEEE address of wireless network device 108 with which to perform the OAD procedure ("0x0011223344556677"); and (3) the network address of wireless network device 108 with which to perform the OAD procedure ("0x019C/0x20"). In response to receipt of OAD command 510, wireless network device 130 sends an acknowledgement reply 512 to commissioner device 102.

In further response to receipt of OAD command 510, wireless network device 130 wirelessly transmits an OAD session start message 514 to wireless network device 122. This may be viewed as an OAD procedure request. Here, OAD session start message 514 is directed to the address of the wireless network device specified in the earlier received OAD command 510. In this embodiment, OAD session start message 514 provides the version number of the desired application program that it requests to receive ("111/0xC00/0x1") and a session number for the OAD procedure ("0x48"). In response, wireless network device 122 wirelessly transmits an OAD session start reply message 516 back to wireless network device 130. This reply message 516 acknowledges or confirms that wireless network device 122 indeed has the specified application program and is available to perform the OAD procedure with wireless network device 130. Preferably, reply message 516 includes a size of the application program ("0xF6B4/8/4") as well as the block size (8 bytes) and the number of blocks (4) per data frame when sent. Through such instruction, wireless network device 122 is engaged to operate as a server in an OAD procedure with wireless network device 130.

In general, a copy of the updated application program is wirelessly communicated from wireless network device 122 (i.e. server) to wireless network device 130 (i.e. client) in the OAD procedure. More specifically, wireless network device 130 operates as a client to wirelessly transmit a series of data request commands 518, 526, . . . , etc., to wireless network device 122, which are requests to receive particular data blocks of the application program in sequential order. The data blocks are wirelessly received through data reply messages 520, 528, . . . , etc., from wireless network device 122 which operates as a server. Each data request command from wireless network device 130 identifies the particular data block that it needs to receive. For example, "0x0" in data request command 518 is an offset to the first data block of the application program, and "0x1" in data request command 526 is the next offset to the second data block of the application program, etc. Each data reply message from wireless network device 122 identifies the particular data block (e.g. as an offset into the application program) that it is sending to wireless network device 130 (e.g. "0x0" in data reply message 520 and "0x1" in data reply message 528), as well as the current device state (3=Server), any error status in response to the command (0=none), and the data block itself. Once the entire application program has been downloaded, wireless network device 130 sends a session terminate command 530 to wireless network device 122. In response, wireless network device 122 sends a session terminate reply 532 to wireless network device 130. This ends the OAD communication session.

During or after communication of the updated application program, commissioner device 102 may send one or more status command messages to wireless network device 130 to identify the progress or current state of wireless network device 130. For example, commissioner device 102 may send a status command message 522 to wireless network device 130 during the communication of the application program, where wireless network device 130 responds by sending a status reply message 524 to commissioner device 102 indicating that the current transfer of the updated application program is incomplete ("110/0xC00/0x1" as the active application program, "0/0/0" as the downloaded application program which is not completely downloaded, and "2/0/10x7B6" as the state which indicates the device status (2=Client), the error response to this query (0=none), the number of the current packet in the session (1), and the total number of packets expected in the session (0x7B6). As another example, commissioner device 102 may send a status command message 534 to wireless network device 130 after the download of the updated application program, where wireless network device 130 responds by sending a status reply message 536 to commissioner device 102 indicating that the current transfer of the application program is complete ("110/0xC00/0x1" as the active application program; "111/0xC00/0x1" as the downloaded application program; and "1/0/0/0" as the state which indicates that device is in the OAD IDLE state (1), the error status to this query (0=none), and, as there is no session in progress, the current packet number is 0 and 0 packets are expected).

When an application program has been downloaded to a wireless network device, it is not automatically enabled as the active application program of the wireless network device. Sometime after commissioner device 102 identifies that an application program has been completely downloaded, it may enable the downloaded application program as the active application program of a wireless network device. In FIG. 5, commissioner device 102 sends a program enable command 538 to wireless network device 130. Program enable command 538 specifies the version number of the application program which should be made active (e.g. "111/0xC00/0x1") in wireless network device 130. In response, wireless network device 130 causes the downloaded application program to serve as the active application program, writing over the current active application program with the downloaded application program. The overwriting procedure may be performed in accordance with the techniques described later in relation to FIGS. 7-11. Wireless network device 130 responds to commissioner device 102 with a program enable reply 540. Preferably, commissioner device 102 waits for all desired wireless network devices to have received the updated application program before instructing most or all such devices to activate the program.

After activation of the updated application program, commissioner device 102 may send another status command message 542 to wireless network device 130. Here, wireless network device 130 responds by sending a status reply message 544 to commissioner device 102 which indicates that the current download and activation of the application program is complete ("111/0xC00/0x1" as the active application program; "111/0xC00/0x1" as the downloaded application program; and "1/0/0/0" as the state which indicates that the device is in the OAD IDLE state (1), the error status to this query (0=none), and, as there is no session in progress, the current packet number is 0 and 0 packets are expected). The OAD procedure between wireless network devices 122 and 130 is complete.

Figure 6:
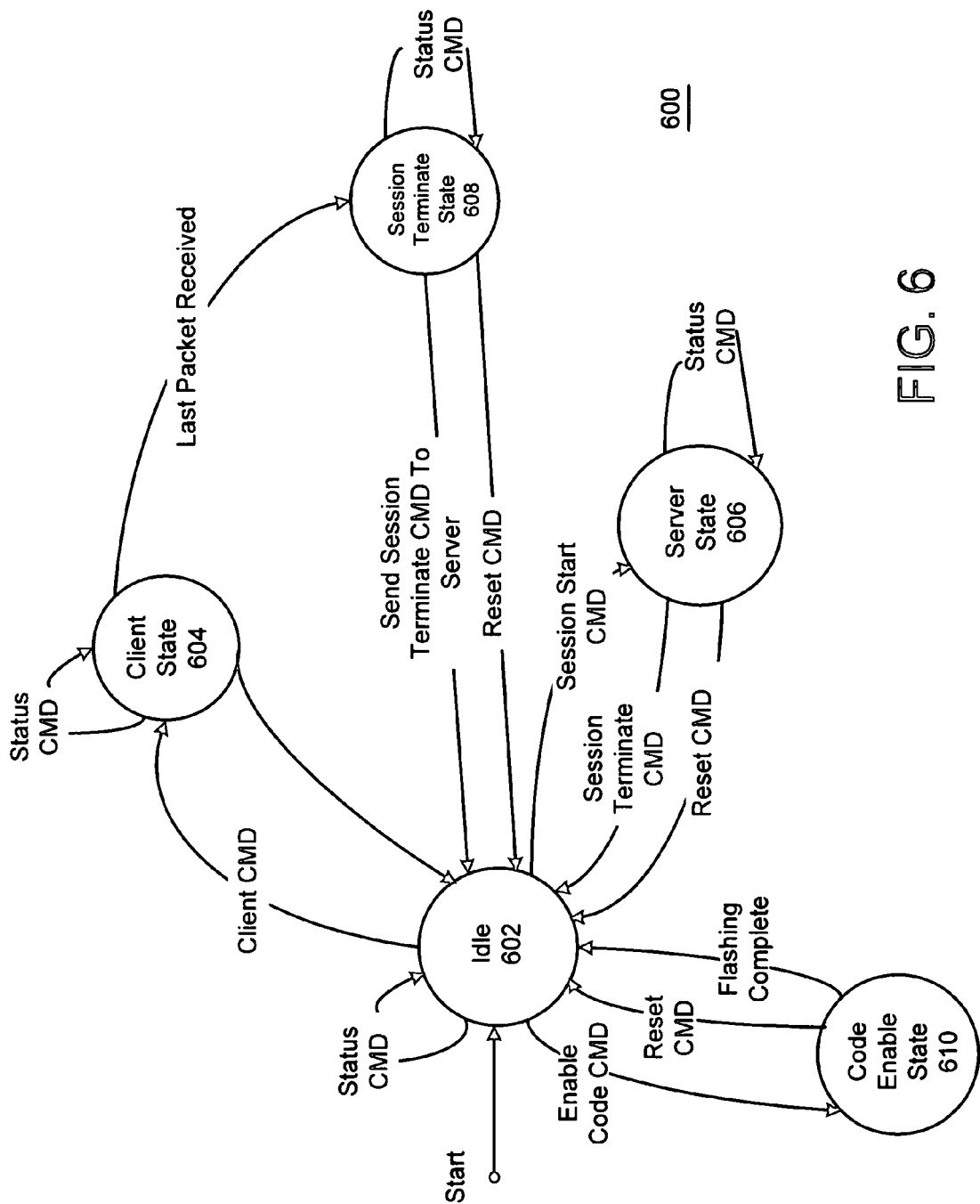
FIG. 6 is a state flow diagram relating to OAD procedures of a wireless network device.

FIG. 6 is a state flow diagram 600 relating to OAD procedures of any one of the wireless network devices 104 of FIG. 1. As shown, each wireless network device has an idle state 602, a client state 604 for OAD, a server state 606 for OAD, a session terminate state 608, and a code enable state 610. As shown, various events recited in FIG. 6 cause transitions between states 602, 604, 606, 608, and 610. As apparent, these events correspond to message events described earlier in relation to FIGS. 4-5.

Operation of commissioner device 102 of FIG. 1 is now described in more detail. When fully realized, commissioner device 102 may have the following capabilities. For one, commissioner device 102 may use network infrastructure to discover device types and device capabilities. Commissioner device 102 may also be the original source for files to be used in the upgrade process. That is, if a particular device type has a new image (e.g. an upgraded application program) to be installed, commissioner device 102 may be the platform from which the image dissemination originates. Since the OAD procedure supports proxy commands, commissioner device 102 need not have native radio capability. Network presence for commissioner device 102 may be provided by any network-complaint device having OAD procedure capability and are adapted to interface with commissioner device 102 (e.g. a PC over a standard communications connection, USB, standard serial connection, or Ethernet via a gateway). Commissioner device 102 may communicate with wireless network device 106 (i.e. the proxy) using the standard OAD procedure protocol. This includes communicating the upgraded application program from commissioner device 102 to the proxy using the OAD procedure.

After issuing status commands to target devices over wireless network 102, commissioner device 102 may determine which devices require upgrades using heuristic or algorithmic means. Commissioner device 102 may also, using heuristic or algorithmic means, assign paths over which the upgrade image can pass by properly assigning client and server roles in succession. Finally, commissioner device 102 may determine network topology and, using heuristic or algorithmic means, assign client-server pairs in such a way as to mitigate network interference of concurrent file transfer transactions between distinct client-server pairs. Because the network infrastructure is in place, file transfer sessions may span multi-hop locations. During file transfer sessions, each wireless network device 104 may continue to perform its intended functionality. Commissioner device 102 maintains OAD procedure discipline by monitoring device status before, during, and after file transfer sessions. When appropriate, the commissioner device 102 instructs a wireless network device to begin activation or execution of the new image., The computer instructions of commissioner device 102 may allow for it to perform the functions described herein (e.g. OAD procedure management functions) automatically and without user intervention. Alternatively, the computer instructions may allow for some or all of the functions to be handled manually by an end user through a user interface (e.g. keyboard and display).

The following description relates to the OAD procedure in more detail from the perspective of commissioner device 106. First, the image to be propagated is obtained by commissioner device 102. It may originate from one of three types of places: (1) the image may already exist on a wireless network device in wireless network 100, which may be the case if a newer version of an existing device were added to wireless network 100; (2) the image may be transferred to commissioner device 102 from another host platform, which would likely be a platform on which the new application image was developed; and (3) commissioner device 102 itself may also be a development platform. Second, commissioner device 102 discovers target devices for the new image by using the network infrastructure to find the network address of each candidate device. The ZigBee specification describes methods by which to perform this discovery which may be utilized. Using the status query provided in the OAD procedure, commissioner device 102 may determine the current version of each target device and determine whether it needs to be upgraded. This determination is done generally by comparing the version numbers of the latest upgrade version and the existing version numbers. Since some wireless network devices 104 may have different application programs for different device applications altogether, commissioner device 102 also determines which types of application programs exist on each wireless network devices 104 by version number for appropriate OAD programming assignment. That is, commissioner device 102 identifies the type of application program required by the wireless network device by the status reply information and thereafter identifies whether and which upgraded application program should be downloaded to it. Finally, using existing network infrastructure, commissioner device 102 may determine network topology. After these two steps, commissioner device 102 is able to determine the network topology with respect to target devices. Heuristic or algorithmic assignment of client-server roles may then be derived.

When the commissioner device 102 does not have native presence in the wireless network, the image to be propagated must be moved to at least one wireless network device that does have network presence. For example, the new image may be moved to wireless network device 106 which acts as a proxy device in wireless network 100 on behalf of commissioner device 102. The transfer is accomplished through use of the standard OAD procedure, where the proxy is assigned as a client and specifies commissioner device 102 as a server. Note that the physical connectivity to commissioner device 102 may exist between any number of wireless network devices 104. For example, a portable type commissioner device 102 may populate any number of wireless network devices distributed throughout wireless network 100. Thereafter, each of these wireless network devices may act as a server throughout the remainder of wireless network 100. Note that a wireless network device may act as a server to other wireless network devices even if the upgraded application program it is supplying is not relevant for the device itself. Through planning, any platform may be available to be a server and commissioner device 102 is free to use such devices as "way stations" for upgraded file propagation.

Other than perhaps making the upgrade image initially available on a wireless network device, commissioner device 102 does not participate in the actual file transfer sessions. Based on its knowledge of the network topology, location of target platforms, and location of platforms that currently hold the upgrade image, commissioner device 102 assigns various wireless network devices 104 as client-server pairs. When an image is transferred to a device, a separate command is required before the image is instantiated or activated on that device. The reason for this is twofold: (1) the image may not be appropriate for the device, which may be the case where the wireless network device is used as a way station; and (2) the updated application program may not be compatible on the network with the previous application programs so that, enabling new code may have to be coordinated across the network.

If commissioner device 102 does not have network presence it needs to be able to send commands and receive replies to other wireless network devices in the wireless network using the proxy device (e.g. wireless network device 106) to which it is physically connected. The proxy device is adapted to process two different types of commands: (1) "normal" commands between commissioner device 102 and wireless network device 106; and (2) "proxy" commands for processing communications between commissioner device 102 and another wireless network device. For example, the proxy device is adapted to process two types of status commands that originate over the direct physical connection: the "normal" status command to which the proxy device itself responds, and the "proxy status command that is sent to another wireless network device on behalf of commissioner device 102 to which it is physically attached. The reply to the proxy status command, as well as other communications, passed back to the connected device transparently. Proxy commands are the means by which commissioner device 102 may assign client roles to arbitrary devices on the wireless network without having presence on the wireless network itself.

The following describes one specific implementation for proxy messaging. In a client-server operating mode, communication between commissioner device 102 and wireless network device 106 is normal. Messages to and from commissioner device 102 appear to wireless network device 106 as any other peer application on wireless network 100. Commissioner device 102 may download a binary file from the host platform to wireless network device 106 for dissemination throughout wireless network 100. In this scenario, commissioner device 102 instructs wireless network device 106 to act as a client with commissioner device 102 as the server. The transactions on wireless network device 106 are exactly as provided in the OAD procedure, except that they are directed to and from the physical connection between commissioner device 102 and wireless network device 106 instead of the radio interface.

In a proxy operating mode, commissioner device 102 is able to direct downloading to and from other wireless network devices by sending and receiving proxy messages to and from such devices through wireless network device 106. In this mode, wireless network device 106 acts as a proxy on behalf of commissioner device 102. Instead of responding itself, wireless network device 106 sends messages from commissioner device 102 out over air and direct replies back commissioner device 102 appropriately (e.g. serving or acting as a gateway).

When commissioner device 102 is the server, i.e., when a new image is being made available for OAD via wireless network device 106 serving as a proxy, commissioner device 102 supplies a special server address in the Client command. This address may be set as follows:

define SERIAL_SERVER_ADDRESS (0xFFFE)

For a proxy device such as wireless network device 106, there are three things that may differentiate proxy mode messages from client-server mode messages: (1) command identifiers; (2) reply identifiers; and (3) command message header content (reply content and format are each the same as the client-server interface). In brief, the message header coming from commissioner device 102 will contain a message identifier and the network address and endpoint to which the message should be forwarded. The payload will be the same as the corresponding message. Wireless network device 106 will generate the appropriate message header and forward the payload over air. Proxy commands are identified by having a specific bit set in the message identifier. The remainder of the message identifier may be the same as the non-proxy version. The message identifiers for commands available for both client-server and proxy handling may be provided as follows:

```
// message ID defines for client-server mode
#define     ZLMSGID_STATUSQ              ((uint8) 0x01)
#define     ZLMSGID_SESSION_START        ((uint8) 0x02)
#define     ZLMSGID_SESSION_TERM         ((uint8) 0x03)
#define     ZLMSGID_CLIENT_CMD           ((uint8) 0x04)
#define     ZLMSGID_CODE_ENABLE          ((uint8) 0x05)
#define     ZLMSGID_SEND_DATA            ((uint8) 0x06)
#define     ZLMSGID_RESET                ((uint8) 0x07)
// bit OR'ed into message ID to signify proxy command
#define     ZLMSGID_PROXY_CMD            ((uint8) 0x40)
#define     ZLMSGID_PROXY_STATUSQ        (ZLMSGID_STATUSQ     | ZLMSGID_PROXY_CMD)
#define     ZLMSGID_PROXY_CLIENT_CMD     (ZLMSGID_CLIENT_CMD  | ZLMSGID_PROXY_CMD)
#define     ZLMSGID_PROXY_CODE_ENABLE    (ZLMSGID_CODE_ENABLE | ZLMSGID_PROXY_CMD)
#define     ZLMSGID_PROXY_RESET          (ZLMSGID_RESET       | ZLMSGID_PROXY_CMD)
```

The only commands not available in proxy mode are those that require the sender to be in the client role. Commissioner device 102 is never in this role in the OAD procedures. The proxy message header is defined as follows:

```
typedef struct {
    uint8    zcproxy_msgid;
    uint16   zcproxy_nwkAddr;
    uint8    zcproxy_endp;
} zcphdr_t;
```

Replies to proxy messages will have the reply bit set just as the client-server replies. The network address and the endpoint should be set appropriately.

Using further techniques of the present application, the downloaded application program of a wireless network device may be enabled or activated in memory in an advantageous manner. Note that, in the following discussion, the lengths L1 and L2 and the memory addresses A1, A2, A3, and A4 are specified as appropriate for the underlying memory technology. For example, if the technology is Flash memory, then these data specify flash pages. If the technology is standard serial EEPROM, than these data specify byte addresses.

Figure 7:
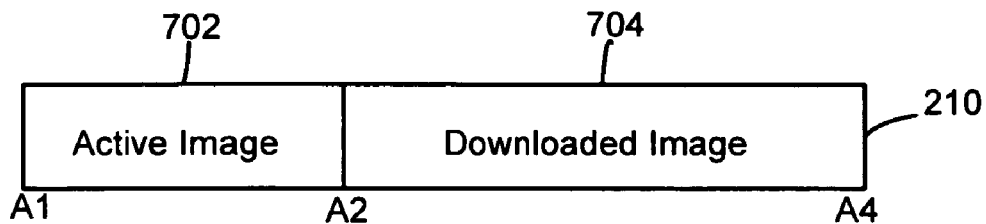
FIG. 7 is an illustration of memory of a wireless network device which stores an (active) application program as well as an updated (downloaded) application program which follows it.
Figure 8:
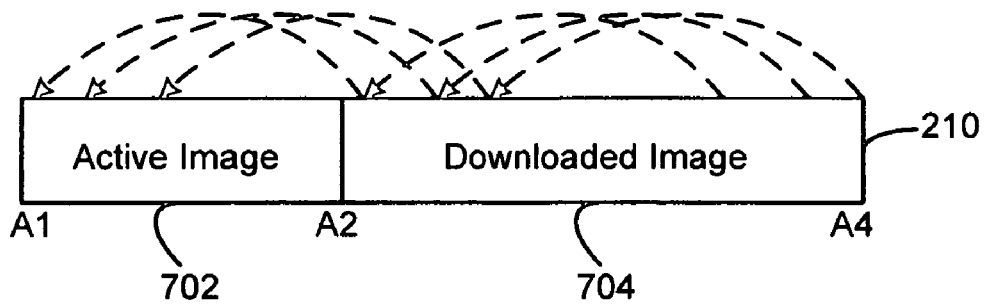
FIG. 8 is an illustration of the memory of the wireless network device of FIG. 7 which reveals that, when the downloaded application program is copied over the active application program, a portion of the original downloaded application may be overwritten which is a concern if a failure occurs while copying.

In FIG. 7, an illustration of memory 210 of a wireless network device which stores an application program ("active image") 702 as well as an updated application program ("downloaded image") 704 in accordance with conventional techniques is shown. As shown, memory 210 is made of a single contiguous memory space. As depicted, application program 702 is stored in memory 210 beginning at a memory address A1 to a memory address A2-1. Updated application program 704 is stored in memory 210 beginning at the memory address A2 to a memory address A4-1. Application program 702 has a length L1 and updated application program 704 has a length L2>L1, which is a longer version or update of application program 702. Memory address A1, which is the location of the beginning of application program 702, is typically the address to which a power-on or reset interrupt vector in the processor is directed.

In response to a predetermined condition, the processor will cause updated application program 704 to be copied over application program 702 beginning at memory address A1. See FIG. 8. The copying process is performed so that the beginning of updated application program 704 will be located at A1, typically the address of the power-on or reset interrupt vector. The predetermined condition that triggers the copying process may be the receipt of an instruction through the wireless transceiver to change or update the application program. The copying process is performed by sequentially reading data of updated application program 704 beginning at memory address A2 while sequentially writing the data over application program 702 beginning at memory address A1. The original application program 702 will no longer be needed and is copied over. As the copying process reaches beyond memory address A2, a beginning portion of the original updated application program 704 will be written over by an end portion of the program.

After the copying process, and/or prior to the updated application program being executed by the processor, a validity check is performed on the updated application program to test the integrity of the data. The validity check may be or include, for example, a cyclical redundancy check (CRC) or a checksum test. If the validity check is successful, then the updated application program is executed by the wireless network device for operation. If the validity check is unsuccessful, however, then the data of the updated application program is identified to be corrupt and the updated application program will need to be recopied at the memory address A1. The validity check may be unsuccessful due to a failure that occurred while the updated application program was being copied over the original application program. Since the beginning portion of the updated application program may have been written over in the copying process, the wireless network device may again have to retrieve a copy of the updated application program from another wireless network device. If the beginning portion of the updated application has been overwritten, then this is not possible since there is no longer a complete viable program image that can run.

Figure 11:
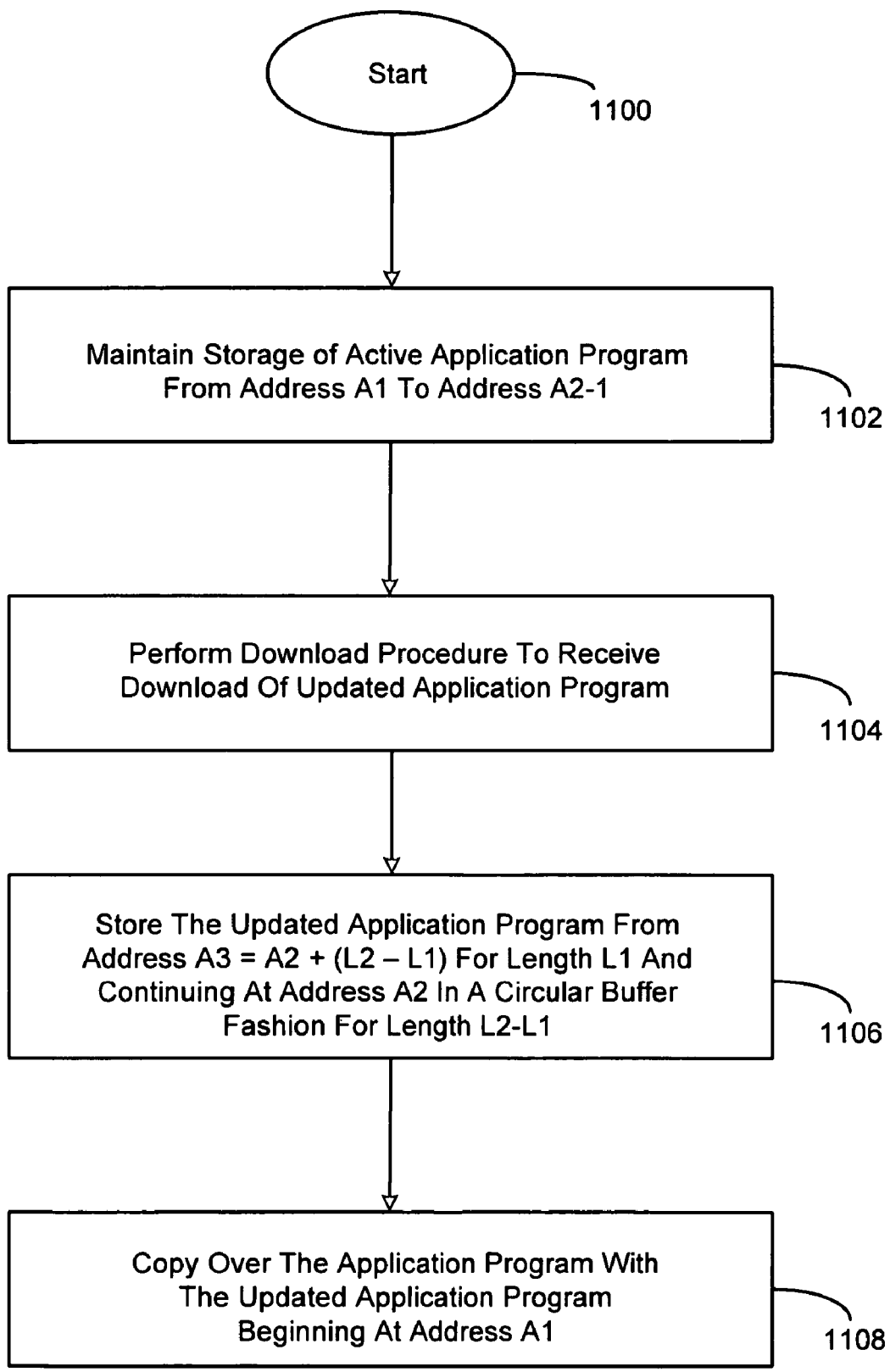
FIG. 11 is a flowchart for describing a method of updating an application program in memory of a wireless network device.

Referring ahead to FIG. 11, a flowchart for describing a method of updating an application program in memory of a wireless network device is shown. This method alleviates the concerns noted in the description of FIGS. 7-8 above. This method is performed by a processor of a wireless network device of a wireless communication network. A computer program product of the present application may include a computer readable medium and computer instructions stored in the computer readable medium which are executable by the processor for performing the method.

Figure 9:
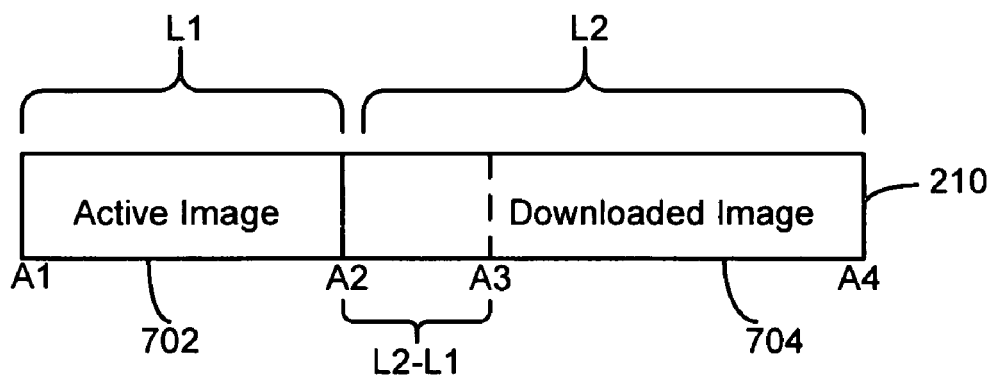
FIGS. 9-10 are illustrations of the memory of the wireless network device which reveals that the downloaded application program may be stored in memory such that no portion of the original downloaded application will be overwritten while copying over the active application program.
Figure 10:
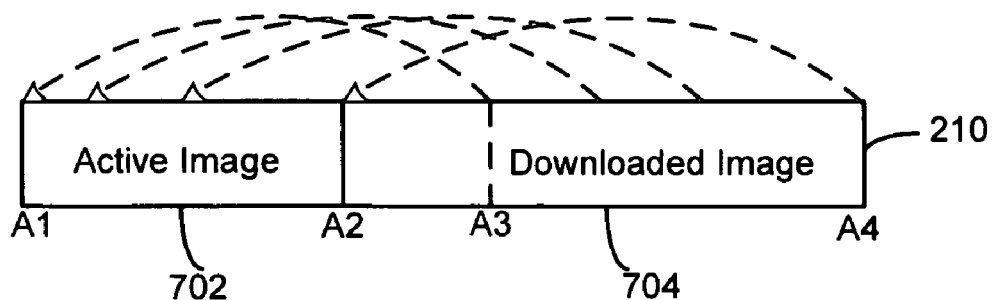

Beginning at a start block 1100 of FIG. 11, the wireless network device maintains storage of an application program having a length L1 in memory of the wireless network device, beginning at a memory address A1 to a memory address A2-1 (step 1102 of FIG. 11). See application program 702 having length L1 stored in memory 202 of FIG. 9. Memory address A1, which is the location of the beginning of application program 702 of FIG. 9, is typically the address to which a power-on or reset interrupt vector in the processor is directed. An over-the-air download procedure is performed by the processor to receive updated application program 704 which has a length L2>L1 (step 1104 of FIG. 11). Updated application program 704 is stored sequentially in the memory beginning at a memory address A3=A2+(L2−L1) for the length L1 (to a memory address A4-1) and continued in a circular buffer fashion from the memory address A2 for the length L2−L1 (step 1106 of FIG. 11). The end of updated application program 704 is stored at memory address A3-1. Compare the storage of the updated application program of FIG. 9 with that of FIG. 8.

In the present embodiment, memory 210 of FIG. 9 is made of a single contiguous memory space. Memory 210 may have, for example, about 128 kilobytes of memory. Application programs may have sizes ranging from 43 kilobytes to 70 kilobytes, for example, for storage within memory 210. In some cases, the available memory space for the concurrent storage of two application programs is less than 2*L2. As apparent, available memory space in memory 210 is limited.

In response to a predetermined condition, the processor will cause updated application program 704 to be copied over application program 702 in a sequential fashion beginning at memory address A1 (step 1108 of FIG. 11). See FIG. 10. The predetermined condition that triggers the copying process may be the receipt of an instruction through the wireless transceiver to change or update the application program. In general, the copying process is performed so that the beginning of updated application program 704 will be located at the address (memory address A1) of the power-on or reset interrupt vector. Specifically, the copying process is performed by sequentially reading data blocks of updated application program 704 beginning at memory address A3, and sequentially writing these data blocks over application program 702 beginning at memory address A1. When memory address A4 is reached during the sequential reading, the writing process may be terminated or ceased at memory address A2 since the appropriate remaining portion of updated application program 704 already remains between memory address A2 and memory address A3-1. The copying process of step 1108 of FIG. 11 is then complete.

After the copying process, and/or prior to the updated application program being executed by the processor, a validity check is performed on the updated application program to test the integrity of the data. The validity check may be or include, for example, a CRC or a checksum test. If the validity check is successful, then the updated application program is executed by the wireless network device for operation. If the validity check is unsuccessful, however, then the data of the updated application program is identified to be corrupt and the updated application program will need to be recopied at the memory address A1 using the same process. The validity check may be unsuccessful due to a failure that occurred while the updated application program was being copied over the original application program. Since no portion of the original updated application program is ever written over or lost from the copying process (i.e. as described earlier in relation to FIG. 8), however, the wireless network device needs not again retrieve a copy of the updated application program from another wireless network device for the recopying.

Final Comments. As described herein, an illustrative embodiment of a wireless network device of the present application includes a controller, memory for storing one or more application programs, and a wireless transceiver coupled to the controller and operative for communications in an ad hoc wireless network. The controller is adapted to execute the application program for controlling operation of the wireless network device. The controller is further adapted to receive, through the wireless transceiver, an instruction which causes the wireless network device to operate as a client in performing an over-the-air download (OAD) procedure for receiving the application program from another wireless network device which is operated as a server in the wireless network, and to operate the wireless network device as the client in performing the OAD procedure in response to such instruction. The controller is further adapted to receive, through the wireless transceiver, one or more instructions which cause the wireless network device to operate as a server in performing the OAD procedure for sending the application program to another wireless network device which is operated as a client in the wireless network, and to operate the wireless network device as the server in performing the OAD procedure in response to such instructions.

An ad hoc wireless communication network of the present application includes at least a first wireless network device, a second wireless network device, and a third wireless network device. The first wireless network device has a first controller, a first wireless transceiver coupled to the first controller and operative for communications in the wireless network, and a first memory for storing one or more application programs. The first controller is adapted to execute the application program for controlling operation of the first wireless network device. The first controller is further adapted to receive, through the first wireless transceiver, an instruction which causes the first wireless network device to operate as a client in performing an OAD procedure for receiving the application program from the third wireless network device which is operated as a server in the wireless network, and to operate the first wireless network device as the client in performing the OAD procedure in response to such instruction. In addition, the first controller is further adapted to receive, through the first wireless transceiver, one or more instructions which causes the first wireless network device to operate as a server in performing the OAD procedure for sending the application program to the second wireless network device which is operated as a client in the wireless network, and to operate the first wireless network device as the server in performing the OAD procedure in response to such instructions. Similar to the first wireless network device, the second wireless network device has a second controller, a second wireless transceiver coupled to the second controller and operative for communications in the wireless network, and a second memory for storing one or more application programs. The second controller is adapted to execute the application program for controlling operation of the second wireless network device. The second controller is further adapted to receive, through the second wireless transceiver, an instruction which causes the second wireless network device to operate as a client in performing the OAD procedure to receive the application program from the first wireless network device which is operated as the server in the wireless network, and to operate the second wireless network device as the client in performing the OAD procedure in response to such instruction. The second controller is further adapted to receive, through the second wireless transceiver, one or more instructions which cause the second wireless network device to operate as a server in performing the OAD procedure for sending the application program to another wireless network device which is operated as a client in the wireless network, and to operate the second wireless network device as the server in performing the OAD procedure in response to such instructions.

An illustrative method for use in facilitating OAD procedures for a plurality of wireless network devices in an ad hoc wireless communication network may involve the acts of receiving, through a wireless transceiver of a wireless network device, an instruction to perform an OAD procedure with another wireless network device in the ad hoc wireless communication network; causing an instruction to initiate the OAD procedure to be sent to the other wireless network device through the wireless transceiver in response to receiving the instruction to perform the OAD procedure; receiving, through the wireless transceiver, an application program from the other wireless network device in the OAD procedure after causing the instruction to initiate the OAD procedure to be sent; and storing the application program in memory of the wireless network device. The act of receiving the instruction to perform the OAD procedure may comprise the further act of receiving an address which identifies the other wireless network device with which to perform the OAD procedure, and the act of causing the instruction to initiate the OAD procedure to be sent may comprise the further act of causing the instruction to be sent to the address which identifies the other wireless network device. Also, the act of receiving the instruction to perform the OAD procedure may comprise the further act of receiving a version number of the application program to be received in the OAD procedure, and the act of causing the instruction to initiate the OAD procedure to be sent to the other wireless network device may comprise the further act of causing the instruction to be sent along with the version number of the application program to be received in the OAD procedure.

A commissioner device of the present application may comprise a controller and a communication interface coupled to the controller. The controller may operative to cause a status request to be sent to a wireless network device of a wireless communication network through the communication interface; receive a status reply from the wireless network device through the network interface which includes a version number of an application program of the wireless network device; and cause an instruction to be sent to the wireless network device through the communication interface which causes it to operate as a client in performing an OAD procedure with another wireless network device of the wireless network for receiving an upgraded application program. The controller may be further operative to cause a discovery request to be broadcasted in the wireless network and, in response to the discovery request, receive discovery responses from the wireless network devices through the communication interface which include addresses of the wireless network devices. The communication interface may be a wired communication interface for connecting with a wireless proxy device of the wireless network, such that the status request and the instruction comprise proxy messages sent by the commissioner device.

A related method of updating an application program in memory of any type of network device is also described. An application program having a length L1 is stored in memory of the wireless network device from a memory address A1 to a memory address A2-1. A download procedure is performed by the network device to receive an updated application program having a length L2>L1. This updated application program is stored in the memory from a memory address A3=A2+(L2−L1) for the length L1 and continued in a circular buffer fashion from the memory address A2 for the length L2−L1. The application program is then copied over with the updated application program beginning at the memory address A1. With this technique, if a failure occurs while copying over the application program, no portion of the original updated application program will be written over.

It is to be understood that the above is merely a description of preferred embodiments of the invention and that various changes, alterations, and variations may be made without departing from the true spirit and scope of the invention as set for in the appended claims. For example, although a ZigBee™ type network has been shown and described as the network of choice, any similar type of network may be utilized. Note that an "updated" or "upgraded" application program may be any suitable revision, version, or variation of the existing application program including any prior versions thereof. Few if any of the terms in the specification and claims have been given any special particular meaning different from their plain language meaning, and therefore the specification is not to be used to define terms in an unduly narrow sense.

The invention claimed is:

1. A wireless network device, comprising:
a controller;
a wireless transceiver coupled to the controller and operative for communications in a wireless communication network;
memory for storing an application program;
the controller being adapted to execute the application program for controlling operation of the wireless network device;
the controller being further adapted to receive, through the wireless transceiver, an instruction which causes the wireless network device to operate as a client in performing an over-the-air download (OAD) procedure for receiving the application program from another wireless network device which is operated as a server in the wireless communication network, and to operate the wireless network device as the client in performing the OAD procedure in response to such instruction; and
the controller being further adapted to receive, through the wireless transceiver, one or more instructions which cause the wireless network device to operate as a server in performing the OAD procedure for sending the application program to another wireless network device which is operated as a client in the wireless communication network, and to operate the wireless network device as the server in performing the OAD procedure in response to such instructions.

2. The wireless network device of claim 1, wherein the controller is further adapted to operate the wireless network device as the client in performing the OAD procedure by sending, through the wireless transceiver, one or more instructions to receive the application program from the wireless network device operating as the server and receiving the application program in response, and the controller is further adapted to operate the wireless network device as the server in performing the OAD procedure by receiving, through the wireless transceiver, the one or more instructions to send the application program to the wireless network device and sending the application program in response.

3. The wireless network device of claim 1, wherein the controller is further adapted to receive the instruction which causes the wireless network device to operate as the client in performing the OAD procedure from a commissioner device different from the other wireless network device.

4. The wireless network device of claim 1, wherein the controller is further adapted to receive the instruction which causes the wireless network device to operate as the client in performing the OAD procedure from a commissioner device, and the controller is further adapted to receive the one or more instructions which cause the wireless network device to operate as the server in performing the OAD procedure from the other wireless network device which operates as the client in receiving the application program.

5. The wireless network device of claim 1, wherein the controller is further adapted to receive, through the wireless transceiver, an instruction which causes the application program stored in the memory to be replaced by the application program received in the OAD procedure.

6. The wireless network device of claim 1, which comprises one of an end device and a router device in the wireless communication network.

7. The wireless network device of claim 1, wherein each one of a plurality of the other wireless network devices in the wireless communication network has a controller, memory, and a wireless transceiver which are adapted to operate in the same manner as the wireless network device.

8. The wireless network device of claim 1, which is part of a wireless network comprising a wireless personal area network (WPAN).

9. A wireless personal area network, comprising:
at least a first wireless network device, a second wireless network device, and a third wireless network device;
the first wireless network device having:
a first controller;
a first wireless transceiver coupled to the first controller and operative for communications in the wireless network;
a first memory for storing an application program;
the first controller being adapted to execute the application program for controlling operation of the first wireless network device;
the first controller being further adapted to receive, through the first wireless transceiver, an instruction which causes the first wireless network device to operate as a client in performing an over-the-air download (OAD) procedure for receiving the application program from the third wireless network device which is operated as a server in the wireless network, and to operate the first wireless network device as the client in performing the OAD procedure in response to such instruction;
the first controller being further adapted to receive, through the first wireless transceiver, one or more instructions which cause the first wireless network device to operate as a server in performing the OAD procedure for sending the application program to the second wireless network device which is operated as a client in the wireless network, and to operate the first wireless network device as the server in performing the OAD procedure in response to such instructions;
the second wireless network device having:
a second controller;
a second wireless transceiver coupled to the second controller and operative for communications in the wireless network;
a second memory for storing the application program;
the second controller being adapted to execute the application program for controlling operation of the second wireless network device; and the second controller being further adapted to receive, through the second wireless transceiver, an instruction which causes the second wireless network device to operate as a client in performing the OAD procedure to receive the application program from the first wireless network device which is operated as the server in the wireless network, and to operate the second wireless network device as the client in performing the OAD procedure in response to such instruction.

10. The wireless personal area network of claim 9, further comprising:
the second controller being further adapted to receive, through the second wireless transceiver, one or more instructions which cause the second wireless network device to operate as a server in performing the OAD procedure for sending the application program to one or more other wireless network devices which are operated as clients in the wireless network, and to operate the second wireless network device as the server in performing the OAD procedure in response to such instructions.

11. The wireless personal area network of claim 9, wherein the first controller is further adapted to operate the first wireless network device as the client in performing the OAD procedure by sending, through the first wireless transceiver, one or more instructions to receive the application program from the third wireless network device operating as the server and receiving the application program in response, and the first controller is further adapted to operate the first wireless network device as the server in performing the OAD procedure by receiving, through the first wireless transceiver, the one or more instructions to send the application program to the second wireless network device and sending the application program in response.

12. The wireless personal area network of claim 9, wherein the first controller is further adapted to receive the instruction which causes the first wireless network device to operate as the client in performing the OAD procedure from a commissioner device different from the other wireless network device.

13. The wireless personal area network of claim 9, comprising a monitoring and/or control system.

14. The wireless personal area network of claim 9, wherein the second controller is further adapted to receive, through the second wireless transceiver, an instruction which causes the application program stored in the second memory to be replaced by the application program received in the OAD procedure.

15. The wireless personal area network of claim 9, wherein the first and the second wireless network devices comprise one of an end device and a router in the wireless personal area network.

16. The wireless personal area network of claim 9, further comprising:
a commissioner device which is operative to send the instructions which cause the first and the second wireless network device to operate as the clients in the OAD procedures.

17. The wireless personal area network of claim 9, further comprising:
a commissioner device which is operative to send the instructions which cause the first and the second wireless network devices to operate as the clients in the OAD procedures;
a wireless network device which serves as a proxy device comprising:
a controller;
a wired communication interface coupled to the controller and adapted for connecting with the commissioner device;
a wireless transceiver coupled to the controller; and
the controller being operative to communicate the instructions to the first and the second wireless network devices through the wireless transceiver.

18. A computer program product, comprising:
a computer readable medium;
computer instructions stored in the computer readable medium;
the computer instructions being executable by a controller of a wireless network device for performing over-the-air download (OAD) procedures in a wireless communication network by:
receiving, through a wireless transceiver of a wireless network device, an instruction which causes the wireless network device to operate as a client in performing the OAD procedure for receiving an application program from another wireless network device which is operated as a server in a wireless communication network, and to operate the wireless network device as the client in performing the OAD procedure in response to such instruction; and
receiving, through the wireless transceiver, one or more instructions which cause the wireless network device to operate as a server in performing the OAD procedure for sending the application program to another wireless network device which is operated as a client in the wireless communication network, and to operate the wireless network device as the server in performing the OAD procedure in response to such instructions.

19. The computer program product of claim 18, wherein the computer instructions are further executable to receive the instruction which causes the wireless network device to operate as the client in performing the OAD procedure from a commissioner device, and to receive the one or more instructions which cause the wireless network device to operate as the server in performing the OAD procedure from the other wireless network device which operates as the client in receiving the application program.

20. The computer program product of claim 18, wherein the computer instructions are further executable to receive, through the wireless transceiver, an instruction which causes the application program stored in the memory to be replaced by the application program received in the OAD procedure.

* * * * *